United States Patent [19]

Campbell

[11] 4,142,600

[45] Mar. 6, 1979

[54] CONTROL SYSTEM FOR AUXILIARY FRONT WHEEL DRIVE

[75] Inventor: John J. Campbell, Decatur, Ill.

[73] Assignee: Caterpillar Tractor Co., Peoria, Ill.

[21] Appl. No.: 774,100

[22] Filed: Mar. 3, 1977

[51] Int. Cl.² .............................................. B60K 25/00
[52] U.S. Cl. .................................. 180/44 F; 180/66 R
[58] Field of Search .................. 180/44 F, 44 M, 66 R

[56] References Cited

U.S. PATENT DOCUMENTS

| 3,458,005 | 7/1969 | Malm et al. ........................ 180/44 M |
| 3,480,099 | 11/1969 | Nighswonger et al. ........... 180/44 M |
| 3,481,419 | 12/1969 | Kress et al. ........................ 180/44 M |
| 3,997,017 | 12/1976 | Campbell et al. .................. 180/44 F |

Primary Examiner—Joseph F. Peters, Jr.
Assistant Examiner—Donn McGiehan
Attorney, Agent, or Firm—Phillips, Moore, Wessenberger, Lempio & Majestic

[57] ABSTRACT

A vehicle includes a pair of hydrostatic motors for selectively driving the front wheels thereof. Connection and disconnection between a pump and such motors is provided by means including electrical switches actuated by appropriate clutches of the transmission of the vehicle.

8 Claims, 5 Drawing Figures

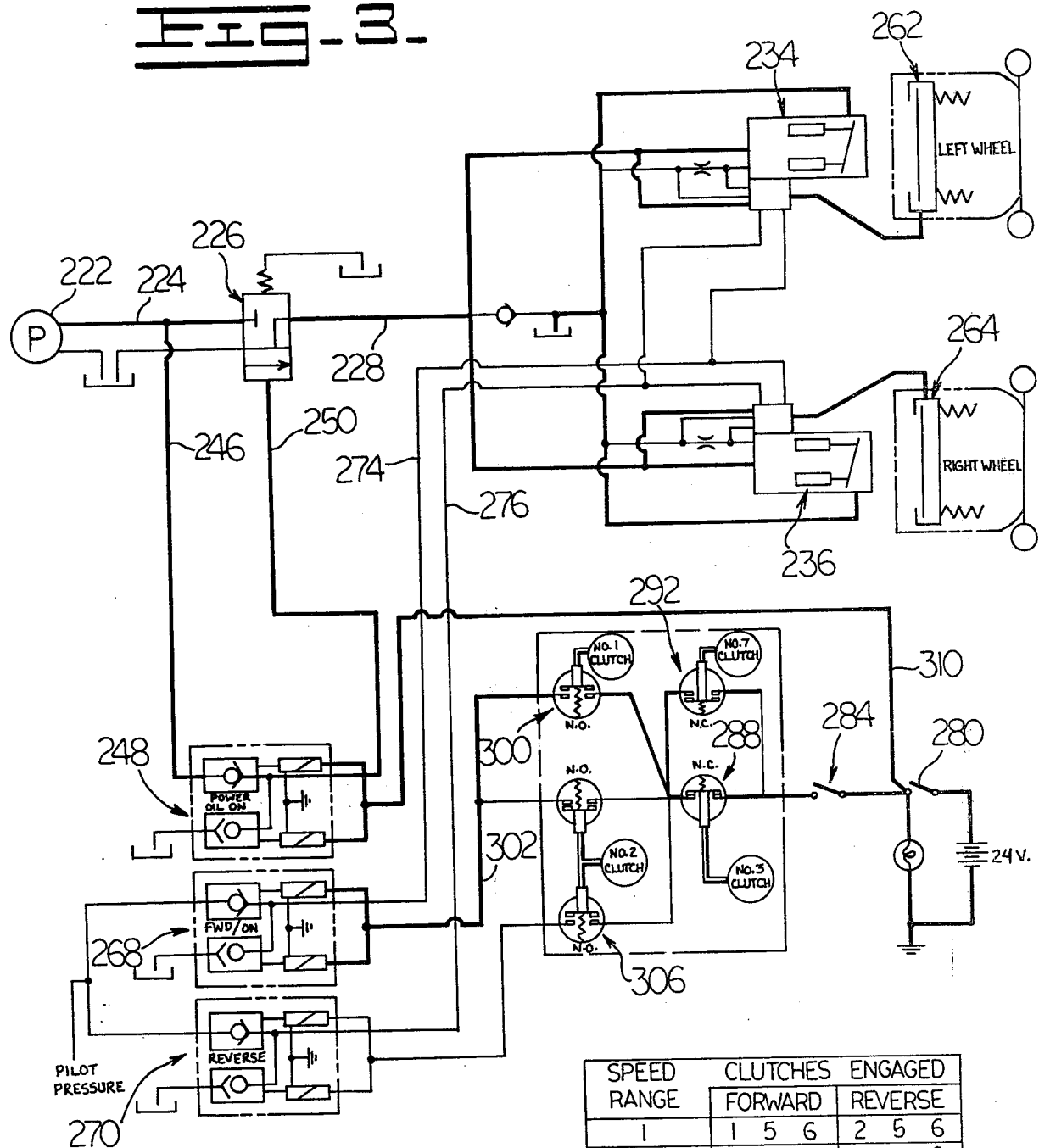

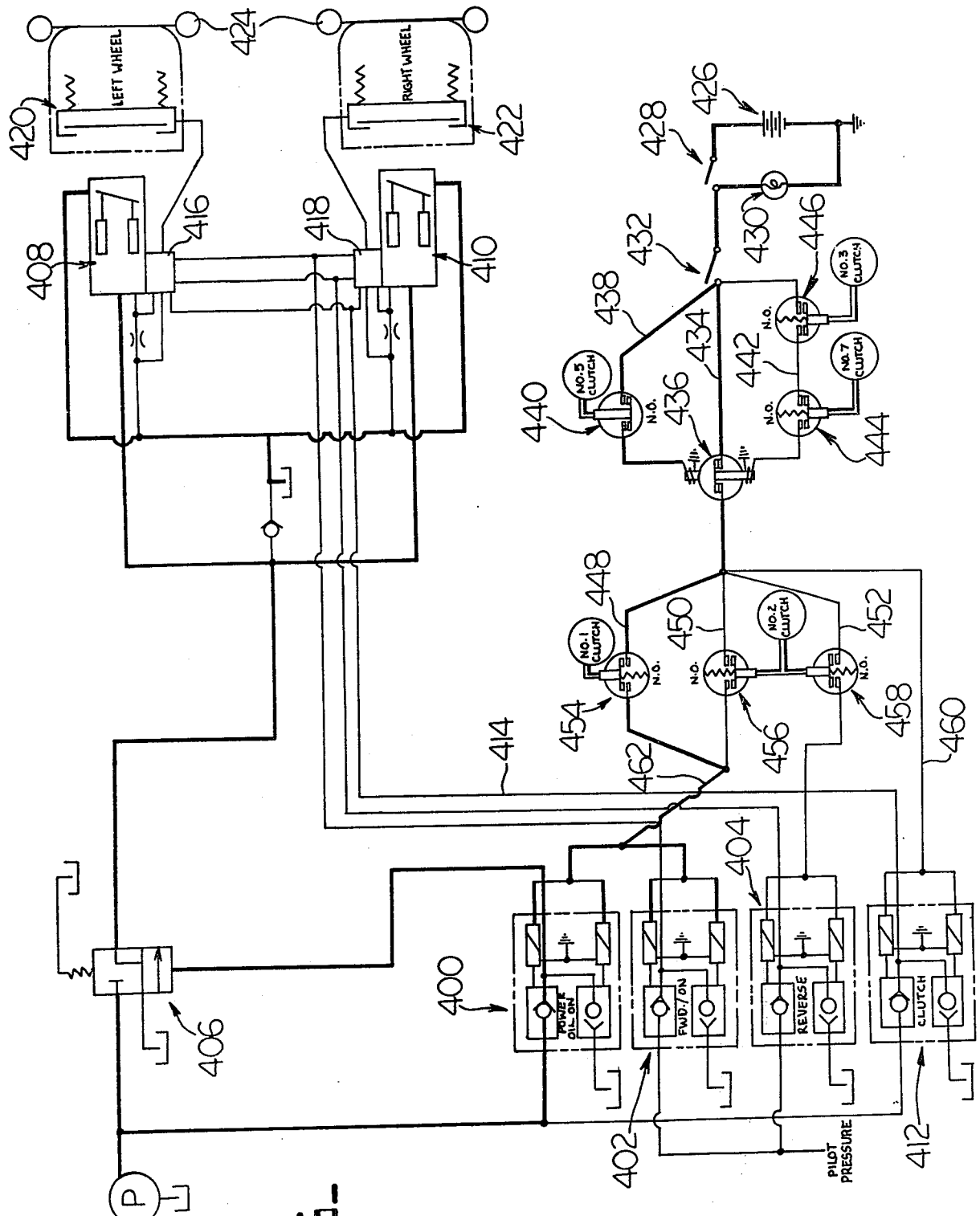

CONTROL SYSTEM FOR AUXILIARY FRONT WHEEL DRIVE

BACKGROUND OF THE INVENTION

This invention relates to an auxiliary hydrostatic front wheel drive system for a vehicle, and more particularly, to such a system wherein electrical switch means are included for selectively actuating such system.

Drive systems of the general type described herein are disclosed in U.S. Pat. No. 3,458,005 to Malm et al, U.S. Pat. No. 3,480,099 to Nighswonger et al, and U.S. Pat. No. 3,481,419 to Kress et al. In general, such systems utilize pilot pressure to actuate valves which provide proper communication between pump means and certain hydraulic motors for driving the front wheels of the vehicle. None of these systems, however, incorporate an electrical/hydraulic control means from an on/off control switch to solenoid control valves for controlling the operation of the motors.

SUMMARY OF THE INVENTION

It is accordingly an object of this invention to provide apparatus for operating auxiliary front wheel drive of a vehicle which includes electrical means in such system for proper operation thereof.

It is a still further object of this invention to provide a system for operating an auxiliary front wheel drive system for a vehicle which, while fulfilling the above object, is simple in design and effective in use.

Broadly stated, the invention is a vehicle including a plurality of transmission clutches selectively engageable and disengageable in a pattern to determine various primary drive conditions of the vehicle. The invention comprises a fluid motor operatively associated with a wheel thereof, a pump, and means operatively interconnecting at least one of the transmission clutches, the pump, and the motor for providing that, upon actuation of such at least one of the clutches, the fluid pump drives the fluid motor to drive the wheel. The means operatively interconnecting such at least one of the transmission clutches and fluid motor comprise electrical switch means.

BRIEF DESCRIPTION OF THE DRAWINGS

These and other objects of the invention will become apparent from a study of the following specification and drawings, in which:

FIG. 3 is a schematic illustration of a second embodiment of an auxiliary front wheel drive system for the vehicle of FIG. 1;

FIG. 4 is a chart of transmission operation of the vehicle, showing which particular transmission clutches are engaged to provide appropriate speed range of the vehicle in the forward and reverse modes thereof, and;

FIG. 5 is a schematic illustration of a third embodiment of an auxiliary front wheel drive system for the vehicle of FIG. 1.

DESCRIPTION OF THE PREFERRED EMBODIMENT

Figure 1:
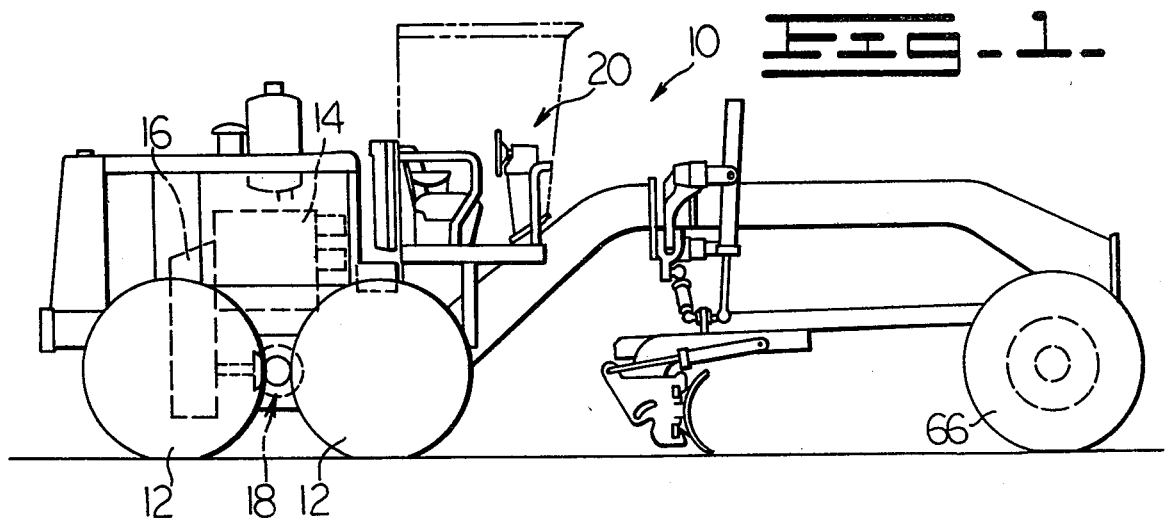
FIG. 1 is a side elevation of a motor grader incorporating the present invention.

Shown in FIG. 1 is a scraper vehicle 10 including rear wheels 12. An internal combustion engine 14 is operatively connected with a transmission 16, in turn driving the wheels 12 through a gear train 18, as is well known. The transmission 16 is actuated by an operator in the operator station 20 of the vehicle 10. The transmission 16 is capable of providing a neutral condition, along with a number of speed ranges both in forward and reverse drive, as is well known, and reference is made to the chart of FIG. 4 for a detailed representation of the operation of such transmission 16. That is, for example, in this particular transmission 16, movement of the appropriate control levers in the operator's station 20 to provide a first speed range off of the transmission in a forward direction provides that hydraulically operated clutch Nos. 1, 5 and 6 of the transmission 16 are engaged. The clutches are of course operatively connected with appropriate gears in the transmission 16 for providing such first speed range forward. As another example, if it is desired that the vehicle 10 be driven in the fourth speed reverse, the operator moves the controls to the appropriate positions selecting fourth speed reverse, which engages clutch Nos. 2, 5 and 7 of the transmission 16, such actuation of the clutches achieving the state of fourth speed reverse through appropriate gears in the transmission 16.

Certain of these hydraulically operated transmission clutches, i.e., in particular transmission clutch No. 1, transmission clutch No. 3, and transmission clutch No. 7 are shown in the lower righthand portion of FIG. 2, and the operation thereof will be described in detail further on.

The system includes a fluid pump 22, and a conduit 24 connected with the output of such fluid pump 22. The conduit 24 communicates with a valve 26, in turn communicating with a conduit 28 which in turn leads to two conduits 30, 32 leading to reversible hydrostatic motors 34, 36, such motors being drivable in one and the other directions. Return lines 38, 40 lead from the hydrostatic motors 34, 36 and communicate with tank 42. A check valve 44 blocks communication between the conduits 30, 32 and conduits 38, 40 when pressure is applied to the conduits 30, 32. A branch conduit 46 leads from the conduit 24 and communicates with a solenoid control valve 48. Another conduit 50 communicates the solenoid control valve 48 with the valve 26, so that if pressure is applied in the conduit 50, the valve 26 is shifted against a spring 52 to an upward position, so that the valve 26 provides communication between the conduit 24 and conduit 28 to so apply fluid pressure to the hydrostatic motors 34, 36 to drive the hydrostatic motors 34, 36.

Such pressure would also be applied to branch conduits 54, 56 which communicate with transmission control valves 58, 60. Pressurized fluid entering the control valves 58, 60 from conduits 54, 56 is transmitted to clutches 62, 64 to engage the clutches 62, 64 so that the motors 34, 36 drive the front wheels 66 of the vehicle 10.

The supply conduit pressure and speed of the rotation of the wheels 66 dictates oil flow to the motors 34, 36 to vary the displacements thereof, to provide proper drive characteristics of the front wheels 66.

Additional solenoid control valves 68, 70 are included as shown. The solenoid control valves 48, 68, 70 are associated with a pilot pressure system supplied to conduit 72 interconnecting the solenoid control valves 68, 70. The solenoid control valve 68 has leading therefrom a conduit 74 which branches to communicate with ports of the control valves 58, 60. The solenoid control valve 70 likewise has a conduit 76 leading therefrom which branches into two parts communicating with other respective ports of the control valves 58, 60. In the present system, if pressure is supplied only in conduit 74, this provides a forward drive of the wheels 66 through driving of the motors 34, 36. If pressure is applied to both conduits 74, 76 to the control valves 58, 60, the wheels 66 are driven in a reverse direction through reversal of the drive of the motors 34, 36.

A vehicle battery 78 is operatively connected with a main switch 80, which turns on an indicator light 82 when closed. In series with the main switch 80 is a clutch switch 84 which opens the circuit each time the vehicle transmission is disengaged by depressing the engine clutch pedal. A line 86 leads from the clutch switch 84 and includes a normally closed switch 88 operatively connected with transmission clutch No. 3. The switch 88 is provided so that if transmission clutch No. 3 is pressurized, the pressure acts on the electrical switch 88 to open such switch 88. A line 90 is in parallel with the line 86, and includes a normally closed electrical switch 92. This electrical switch 92 is operatively connected with transmission clutch No. 7, so that if transmission clutch No. 7 is pressurized, such pressure acts on the switch to open the switch 92. Yet another line 94 leads from the line 86, including therein a normally open electrical switch 96 in operative association with transmission clutch No. 2, so that if transmission clutch No. 2 is pressurized, the switch 96 is closed. A line 98 is in parallel with the line 94, and includes therein a normally closed electrical switch 100 in operative association with transmission clutch No. 1. Upon pressurization of transmission clutch No. 1, the electrical switch 100 will close. A line 102 leads from the line 94 and branches out to communicate with both the solenoid control valve 48 and the solenoid control valve 68.

Yet another line 104 leads from the solenoid control valve 70 to the point of connection of the lines 86, 90, and has therein a normally open switch 106 in operative association with the transmission clutch No. 2, so that if transmission clutch No. 2 is pressurized, the switch 106 will be closed.

Initially, in the operation of the apparatus, the main switch 80 is closed to turn on the indicator light 82, indicating to the operator that the auxiliary front wheel drive system is in operation. Assuming that the engine clutch is engaged, closing the switch 84, we will further assume that the neutral condition of the transmission is selected. Such neutral condition causes transmission clutch Nos. 3 and 7 to be pressurized (FIG. 4), opening the electrical switches 88, 92, so that no power is supplied to any of the solenoid control valves 48, 68, 70. Without power being supplied in particular to the solenoid control valve 48, fluid pressure in conduit is not transmitted through the solenoid control valve 48 to the valve 26, so that no fluid pressure is supplied to the hydrostatic motors 34, 36.

Assuming, for example, selection of the first speed range of the transmission 16 in a forward mode, transmission clutch No. 1, along with certain other transmission clutches, but not transmission clutch Nos. 2, 3 or 7, is engaged. Such engagement causes the switch 100 to close, and with both switches 88, 92 closed, electrical powder is supplied through the line 102 to both the solenoid control valves 48, 68. This causes solenoid control valve 48 to open, allowing fluid pressure through the conduit 50 to the valve 26 to move the valve 26 into an upward position, wherein fluid pressure is supplied from the pump 22 to the hydrostatic motors 34, 36 to drive the hydrostatic motors 34, 36. Fluid pressure is also supplied to engage the clutches 62, 64, so that appropriate front wheel drive of the vehicle 10 takes place. Meanwhile, application of electrical energy to the solenoid control valve 68 causes the solenoid control valve 68 to open, so that pilot pressure is applied to the conduit 74, determining a forward drive condition of the motors 34, 36.

Assuming, for example, selection of the fourth speed range forward of the transmission 16, transmission clutch Nos. 1 and 7 will be applied, causing switch 100 to close and switch 92 to open. Electrical energy will then be applied through line 86, through lines 98, 102 and to both the solenoid valves 48, 68, to again provide forward driving of the hydrostatic motors 34, 36 in the same manner.

Assuming, for example, selection of fourth speed range in reverse, transmission clutch Nos. 2 and 7 will be applied, to provide that switch 96 is closed, switch 106 is closed, and switch 92 is open. Thus, electrical energy is provided to all three solenoid control valves 48, 68, 70, so that fluid pressure drives the motors 34, 36, but with pilot pressure in both the conduits 74, 76 determining a reverse drive condition of the motors 34, 36.

If the sixth speed range of the transmission, in either forward or reverse is chosen, both transmission clutch Nos. 3 and 7 will be actuated, opening both switch 92 and switch 88 so that no electrical power is provided to any of the solenoid control valves 48, 68, 70, in turn providing that the auxiliary front wheel drive system is not in operation.

Figure 2:
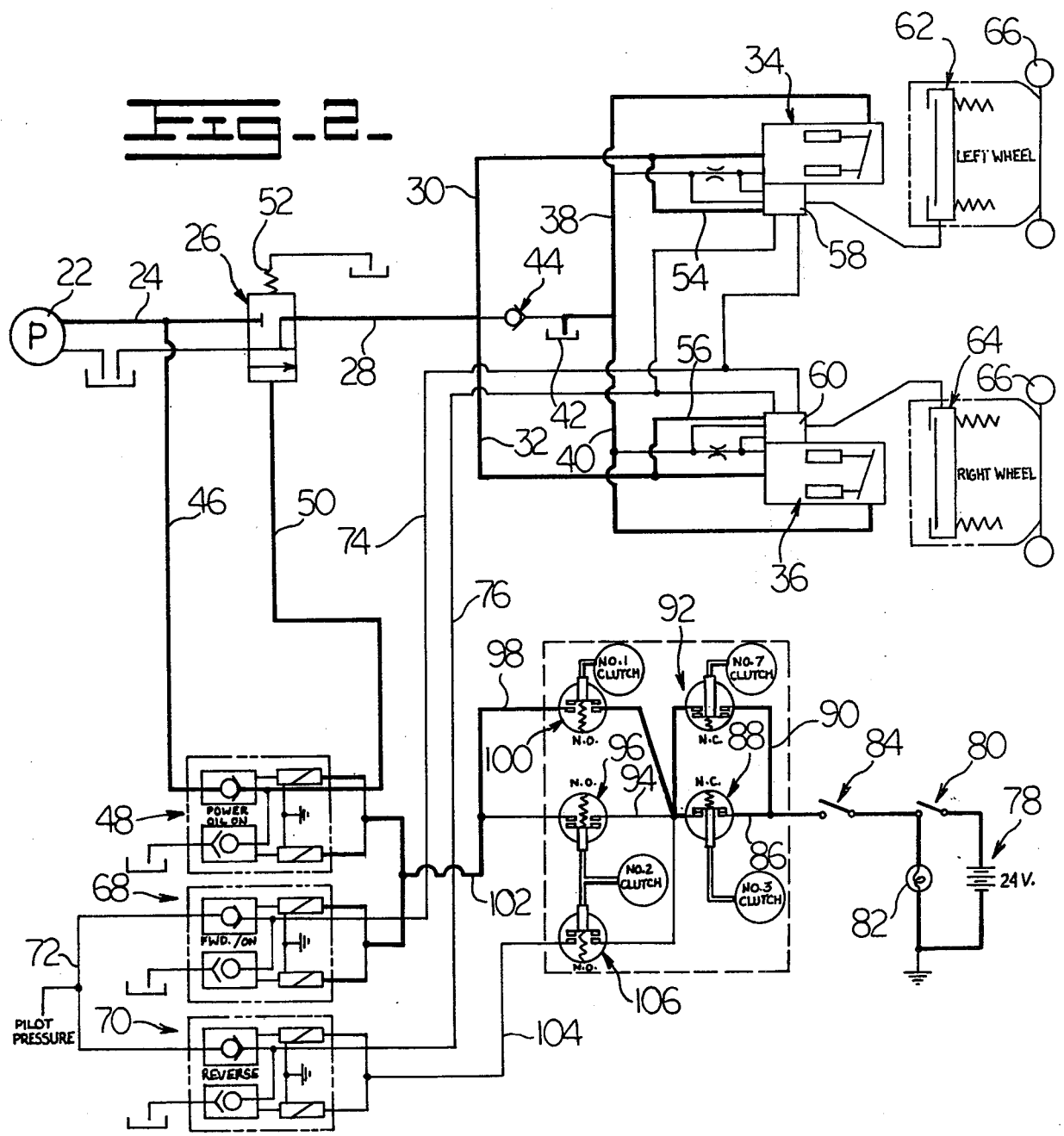
FIG. 2 is a schematic illustration of a first embodiment of auxiliary front wheel drive system for the vehicle of FIG. 1.

Shown in FIG. 3 is a system quite similar to that shown in FIG. 2. However, in the FIG. 3 system, the main switch 280 has connected thereto a line 310 directly communicating with the solenoid control valve 248, and the line 302, previously communicating with both the solenoid control valves 48, 68, communicates only with the solenoid control valve 268. Thus, upon closing of the main switch 280, electrical powder is supplied to the solenoid control valve 248 to in turn provide that pressurized fluid is supplied through the conduit 250 to move the valve 226 upwardly, so that the pump 222 supplies fluid to the hydrostatic motors 234, 236 and provides fluid pressure to engage the clutches 262, 264. Thus, in this embodiment, actuation of the solenoid control valve 248 so that pressurized fluid is supplied to the motors 234, 236 is not dependent on the actuation of any transmission clutches, as in the previous embodiment, but only on the closing of the main switch 280 by the operator of the vehicle.

Shown in FIG. 5 is yet another embodiment of the system. Such system is generally similar to the FIG. 2 system, including solenoid control valves 400, 402, 404 in association with a valve 406, all operatively coupled with reversible hydrostatic motors 408, 410. In this system, however, an additional solenoid control valve 412 is included, being actuatable to supply pilot hydraulic fluid through a conduit 414 to transmission control valves 416, 418 to engage the clutches 420, 422 so that the motors 408, 410 drive the front wheels 424 of the vehicle.

The system again includes a vehicle battery 426 operatively connected with a main switch 428, which turns on an indicator light 430 when closed. A clutch switch 432 is again in series with the main switch 428, opening each time the vehicle transmission is disengaged by depressing the engine clutch pedal. A line 434 leads from the clutch switch 432 to a two-position over-center switch 436 shown in the closed position. The switch 436 is movable to an upward position to open the line 434. A branch line 438 also leads from the clutch switch 432 to one side of the over-center switch 436, and a normally open electrical switch is placed in such line 438, being closable upon pressurization of clutch No. 5. Closing of such switch 440 moves the over-center switch 436 downward to a closed position, if such over-center switch 436 is already not in such position. Also extending from the clutch switch 432 is another branch line 442, having in series therein a pair of normally open switches 444, 446, the switch 444 being operatively connected with the transmission clutch No. 7, so that if transmission clutch No. 7 is pressurized, such pressure acts on the switch 444 to close the switch 444. Similarly, the switch 446 is operatively connected with transmission clutch No. 3, so that if transmission clutch No. 3 is pressurized, such pressure acts on the switch 446 to close the switch 446. Upon closing of both the switches 444, 446, the over-center switch 436 is urged into an upward, or open position. The operation of the switches in association with the clutches Nos. 3, 5 and 7 will be described further on in detail.

Clutch Nos. 1 and 2 are associated with lines 448, 450, 452 and switches 454, 456, 458 and the solenoid control valves 400, 402, 404 in a manner identical to that shown in FIG. 2.

Another line 460 branches off from adjacent the over-center switch 436 to the solenoid control valve 412, which is in operative association with the clutches 420, 422.

In the use of this apparatus, assuming, for example, the selection of the fourth speed range of the transmission in the forward mode, reference is again made to the chart in FIG. 4. In such case, clutch Nos. 1, 5 and 7 are pressurized, but not clutches 2 and 3 of FIG. 5. Closing the main switch 428 results in electrical power being applied to the upper side of the over-center valve 436, moving it to a closed position, it being remembered that the switch 446 associated with clutch No. 3 is open. Electrical power is applied to line 462 and to solenoid control valves 400, 402, so that the motors 408, 410 are driven and the wheels 424 are in turn driven in the forward mode. Electrical power is also applied to the solenoid control valve 412 to apply pilot pressure to the transmission control valves 416, 418 to cause engagement of the clutches.

Shifting now to fifth speed forward, clutch Nos. 1, 4 and 7 are engaged, so that switch 440 is open as is switch 446, so that electrical power is no longer supplied to either side of the over-center switch 436. However, with such switch 436 being of the over-center type, it will remain in the closed position, so that the previous overall operation of the system of FIG. 5 is still in effect.

If the transmission is shifted to the sixth speed forward, clutches 1, 3 and 7 are pressurized, closing switches 446, and 444 to move the over-center switch 436 upwardly, to an open position, so that no electrical power is supplied to any of the solenoid control valves. This results in a state wherein front wheel drive of the vehicle no longer takes place. Thus, upon selection in succession of the fourth and fifth speeds of the vehicle, the wheels 424 are driven. But, upon selection in succession of the sixth speed, following the selection of the fifth speed, drive is no longer provided to the wheels 424.

Assuming now that the operator wishes to shift from sixth speed forward back to fifth speed forward, it will be understood that the vehicle may be travelling at a very high rate of speed in sixth speed, and a sudden shift into fifth speed forward, with a simultaneous bringing in of the front wheel drive of the system could result in the front wheel drive of the system being overspeeded. As will be seen, however, in the embodiment of FIG. 5, if fifth speed is selected in succession following the selection of sixth speed, the front wheel drive system is not operable, but rather the operator of the vehicle must shift into fourth speed before front wheel drive can be reengaged.

It is to be remembered that in sixth speed, the over-center switch 436 is in the open position. Shifting from sixth speed forward to fifth speed forward causes engagement of clutches 1, 4 and 7, so that switch 440 and switch 446 both remain open, so that no power is supplied beyond the over-center switch 436. Thus, the front wheel drive system of the vehicle remains disengaged. Upon shifting of the transmission to fourth speed forward, clutch Nos. 1, 5 and 7 are engaged, resulting in the fact that switch 440 associated with clutch No. 5 closes, provides electrical power to the over-center switch 436 to move the over-center switch 436 downward to a closed position and provides electrical power through switch 454 to the solenoid control valves 400, 402 and through conduit 460 to the solenoid control valve 412 so that front wheel drive of the vehicle is again engaged.

It will be seen that operating the vehicle in various reverse speeds provide a similar operation of the front wheel drive system of the vehicle.

The embodiments of the invention in which an exclusive property or privilege is claimed are defined as follows:

1. In a vehicle including a plurality of hydraulically operated transmission clutches selectively engageable and disengageable in a pattern to determine various primary drive conditions of the vehicle, a fluid motor drivingly connected to a wheel thereof; a fluid pump and a first conduit means for providing fluid communication between said fluid pump and said fluid motor; wherein said first conduit means includes a valve having a first position blocking communication between said pump and said motor, and a second position providing communication between said pump and said motor; and electrical switch means responsive to fluid pressure applied to at least one of said transmission clutches; and second conduit means for providing communication at least between the electrical switch means and the valve, said electrical switch means for activating said valve to the second position for providing that, upon actuation of at least one of said clutches, said fluid pump drives said fluid motor to drive said wheel.

2. The apparatus of claim 1 wherein the second conduit means comprises solenoid control valve means, a third conduit providing fluid communication between the pump and the solenoid control valve means, and a fourth conduit providing fluid communication between the solenoid control valve means and the valve, the solenoid control valve means for controlling the position of the valve by controlling the flow of fluid from the pump through the third and fourth conduits to the valve, wherein the second conduit means includes a fifth conduit providing communication between the electrical switch means and the solenoid control valve means, and wherein the solenoid control valve means is responsive to operation of said electrical switch means.

3. The apparatus of claim 1 wherein the electric switch means is responsive to a certain number of said plurality of transmission clutches to provide that, upon actuation of the certain number of said plurality of transmission clutches, said fluid pump drives said fluid motor; and wherein said electric switch means comprising a plurality of electrical switches, each electrical switch being operatively connected with one of said certain number of transmission clutches.

4. The apparatus of claim 1 wherein the fluid motor is a reversible fluid motor, drivable in one and the other direction, said apparatus further comprising means for selectively reversing the motor.

5. The apparatus of claim 4 wherein the means for selectively reversing the motor comprise another electrical switch means operatively connected with a transmission clutch of said plurality thereof.

6. The apparatus of claim 5 wherein the means for selectively reversing said motor further comprise solenoid control valve means responsive to actuation of said another electrical switch means to define drive of said motor in one and the other directions.

7. In a vehicle including a plurality of hydraulically operated transmission clutches selectively engageable and disengageable in a pattern to determine at least first, second and third primary drive conditions of the vehicle, a fluid motor drivingly connected to a wheel thereof, a fluid pump and first conduit means for providing fluid communication between said fluid pump and said fluid motor; and wherein said first conduit means includes a control valve having at least a first position blocking communication between said pump and said motor and a second position providing communication between said pump and said motor; an electrical switch means responsive to fluid pressure applied to at least one of said hydraulically operated transmission clutches, a second conduit means for providing communication between the electrical switch means and said control valve, said electrical switch means for activating said control valve selectively to the second position upon selection of each of the first and second primary drive conditions of the vehicle in succession for providing that said fluid pump drives said fluid motor to drive said wheel, and said electrical switch means for further providing that upon selection of the third primary drive condition in succession following the selection of said second primary drive condition, the control valve is activated to the first position to prevent said fluid pump from driving said fluid motor and said wheel, and said electrical switch means for further selectively providing that upon selection of the second primary drive condition in succession following the selection of said third primary drive condition, the control valve remains in the first position.

8. The apparatus of claim 7 including the electrical switch means for further selectively providing that upon selection of the first primary drive condition in succession following successive selection of the third and second primary drive conditions, the control valve is activated to the second position for again providing the said fluid pump drives said fluid motor and said wheel.

* * * * *